(12) United States Patent
Pannell et al.

(10) Patent No.: US 7,742,488 B1
(45) Date of Patent: *Jun. 22, 2010

(54) ROUTER HAVING A SINGLE CPU MAC

(75) Inventors: Donald Pannell, Cupertino, CA (US); Yosef Meyouhas, Har Adar (IL); Peter Wang, San Jose, CA (US); Maxim Mondaeev, Givat-Ela (IL)

(73) Assignees: Marvell International Ltd., Hamilton (BM); Marvell Israel (M.I.S.L) Ltd., Yokneam (IL)

( * ) Notice: Subject to any disclaimer, the term of this patent is extended or adjusted under 35 U.S.C. 154(b) by 0 days.

This patent is subject to a terminal disclaimer.

(21) Appl. No.: 11/809,822

(22) Filed: Jun. 1, 2007

Related U.S. Application Data

(62) Division of application No. 10/292,181, filed on Nov. 12, 2002, now Pat. No. 7,653,071.

(60) Provisional application No. 60/379,223, filed on May 9, 2002.

(51) Int. Cl.
*H04L 12/28* (2006.01)
*H04L 12/56* (2006.01)

(52) U.S. Cl. ........................... 370/401; 370/392

(58) Field of Classification Search ............ 370/389, 370/392, 401, 474, 395.5, 395.53, 229, 230, 370/235, 400; 709/227, 230, 236, 249
See application file for complete search history.

(56) References Cited

U.S. PATENT DOCUMENTS

| | | | |
|---|---|---|---|
| 5,959,990 A | 9/1999 | Frantz et al. | |
| 5,978,378 A | 11/1999 | VanSeters et al. | |
| 6,151,316 A | 11/2000 | Crayford et al. | |
| 6,233,236 B1 | 5/2001 | Nelson et al. | |
| 6,442,161 B1 * | 8/2002 | Drummond-Murray et al. | 370/389 |
| 6,680,945 B1 * | 1/2004 | Merchant et al. | 370/395.53 |
| 6,909,711 B1 | 6/2005 | Noguchi | |
| 7,002,967 B2 * | 2/2006 | Denton et al. | 370/395.5 |
| 7,164,687 B2 | 1/2007 | Namihira | |
| 7,171,504 B2 | 1/2007 | Ishii | |
| 7,197,035 B2 | 3/2007 | Asano | |
| 7,336,661 B2 | 2/2008 | Makela et al. | |
| 2001/0030970 A1 | 10/2001 | Wiryaman et al. | |
| 2003/0093563 A1 | 5/2003 | Young et al. | |
| 2004/0255047 A1 | 12/2004 | Larson et al. | |
| 2005/0041659 A1 * | 2/2005 | Paul et al. | 370/389 |

OTHER PUBLICATIONS

IEEE Standard 802.1D, Information technology—Telecommunications and information exchange between systems—Local and metropolitan area networks—Common specifications, Part 3: Media Access Control (MAC) Bridges, 1998 Edition, pp. 1-335.
IEEE Standard 802.3. IEEE Standard for Information technology—Telecommuncations and information exchange between systems—Local and metropolitan area networks—Specific requirements, Part 3: Carrier sense multiple access with collision detection (CSMA/CD) access method and physical layer specifications, 2000 Edition, pp. 1-182.

* cited by examiner

*Primary Examiner*—Frank Duong
*Assistant Examiner*—Feben Haile

(57) ABSTRACT

A network device comprises one or more first ports to receive at least one layer 2 frame of data comprising a media access control (MAC) client data field. An egress policy module adds M bits to the frame of data before the MAC client data field, where M is an integer greater than zero. A second port transmits the frame of data after the M bits are added to the frame of data.

22 Claims, 7 Drawing Sheets

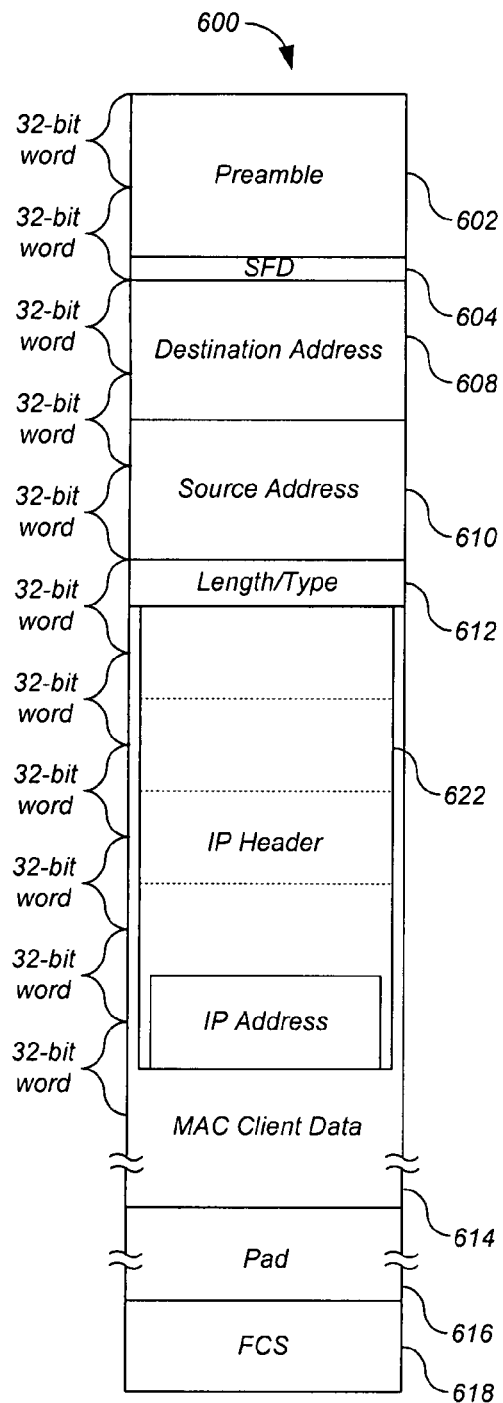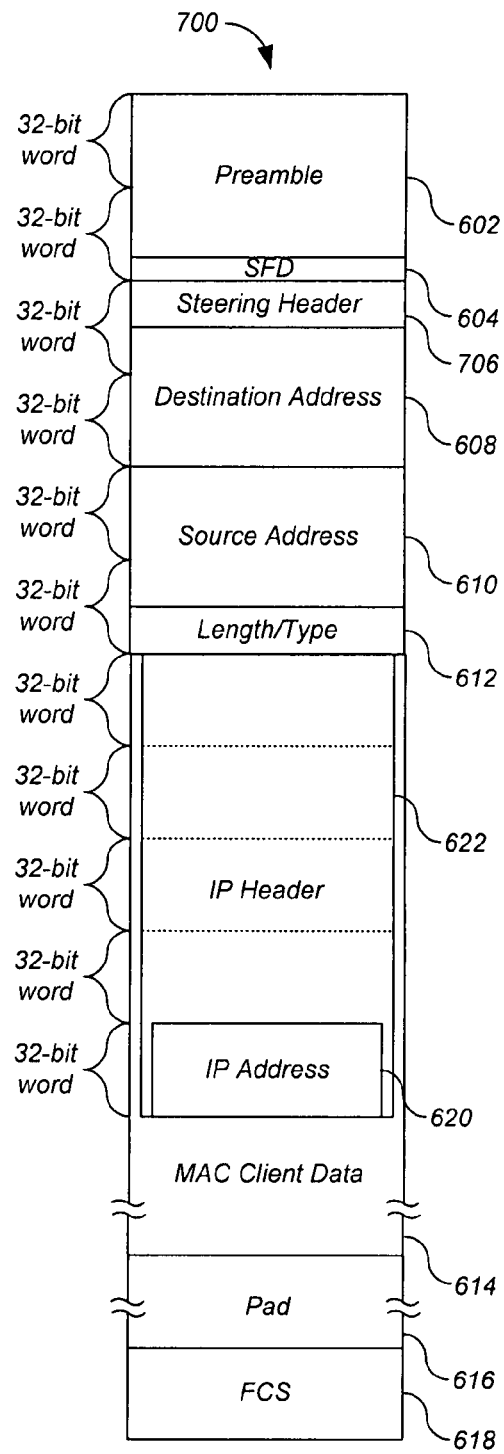
FIG. 6
PRIOR ART
FIG. 7

ROUTER HAVING A SINGLE CPU MAC

CROSS-REFERENCE TO RELATED APPLICATIONS

This application is a Divisional of U.S. Ser. No. 10/292,181 filed Nov. 12, 2002, which application claims the benefit of U.S. Provisional Patent Application Ser. No. 60/379,223, filed May 9, 2002. The disclosures of the above applications are incorporated herein by reference.

BACKGROUND

The present invention relates generally to data communications, and particularly to steering frames of data within a network device such as a router.

The fastest-growing market for computer hardware is the Small Office/Home Office (SOHO) market. One of the most important computer hardware components for the SOHO market is the router, which enables multiple computers or other network-enabled devices to share a single broadband Internet connection. A router transfers data between two or more different networks. A network is group of devices that are interconnected to exchange data where each of the devices has an internet protocol (IP) address that is unique within the network. However, IP addresses can be reused in separate networks. That is, a device in one network can have the same IP address as another device in a different network. A router translates IP addresses to ensure that data sent from one network to another reaches the intended device. Conventional routers generally have a dedicated wide-area network (WAN) port that is connected to the Internet through an Internet service provider (ISP), and several local-area network (LAN) ports that are each connected to one of the computers or network-enabled devices in the office. One disadvantage of such conventional routers lies in the dedicated WAN port. Because conventional routers have only one WAN port, they are incapable of supporting multiple WANs, as is desirable for network load-balancing using multiple ISPs or for redundant backup support. And because the WAN port is physically a dedicated port, it must be connected to the correct port (i.e., the WAN port), making setup more difficult.

FIG. 1 shows a conventional router 100 connected to a WAN 102 and a LAN 104 comprising a plurality of network-enabled devices (NED) 106A through 106N. Router 100 includes a dedicated WAN 108 port, connected to WAN 102, that communicates with a central processing unit (CPU) 110 through a WAN network interface controller 112. Router 100 also comprises a switch 114 comprising a plurality of LAN ports 116A through 116N, each connected to one of NEDs 106A through 106N, and a CPU port 118 that communicates with CPU 110 through a LAN network interface controller 120. WAN network interface controller 112 comprises a WAN media access controller (MAC) 122. LAN network interface controller 120 comprises a LAN MAC 124.

One disadvantage of the architecture of router 100 is that a separate MAC is required for each network, making the router more expensive to manufacture. And adding other networks requires more MACs. For example, adding a wireless LAN port would require the addition of another separate MAC to pass data between the wireless LAN and the CPU. Further, many customers are requesting routers with a "demilitarized zone" (DMZ) port to support servers that are available to both the WAN and LAN while keeping the WAN and LAN isolated. In conventional routers, the addition of a DMZ port would require the addition of a separate MAC to support the DMZ port because the DMZ cannot be connected to switch 114. Such a connection would create a security breach, allowing anyone that has access to the DMZ to also have access to the LAN 104.

Another popular router feature is quality of service (QOS), where each frame of data is assigned one of several prioritized classes of service. When the router becomes congested, it handles the frames according their classes of service. In conventional routers, the CPU makes all of the QOS decisions, thereby wasting CPU cycles that could better be used for faster and/or better routing.

SUMMARY

In general, in one aspect, the invention features a router comprising a processor; a single media access controller connected to the processor; and a switch comprising a plurality of ports, wherein one of the ports is connected to the single media access controller.

In general, in one aspect, the invention features a method, apparatus, and computer-readable media for transferring data from a first network to a second network through a router, comprising. It comprises (a) receiving a frame of the data from the first network, the frame comprising an internet protocol address; (b) transmitting the frame to a media access controller of the router; (c) transmitting the frame from the media access controller to a processor of the router, wherein the processor modifies the internet protocol address; (d) transmitting the frame from the processor to the media access controller; and (e) transmitting the frame from the media access controller to the second network.

Particular implementations can include one or more of the following features. Implementations comprise adding a network identifier for the first network to the frame before transmitting the frame to the media access controller; wherein transmitting the frame from the media access controller to the processor comprises transmitting the frame from the media access controller to one of a plurality of receive queues according to the network identifier in the frame, wherein each of the queues is associated with one of the first and second networks. The frame has one of a plurality of classes of service; and the processor modifies the network identifier of the frame to identify the second network, and places the frame in one of a plurality of transmit queues according to a class of service of the frame, wherein each of the transmit queues is associated with one of the classes of service; and the method further comprises transmitting the frame from the transmit queues to the second network according to the classes of service associated with the transmit queues. The first receive queue comprises a plurality of first class of service queues each associated with one of the classes of service and the second receive queue comprises a plurality of second class of service queues each associated with one of the classes of service, and implementations further comprise transmitting the frame from the media access controller to one of the receive queues according to the network identifier in the frame and the class of service of the frame. The frame when received from the first network comprises a plurality of words including a first word comprising a first portion of the internet protocol address and a second word comprising a second portion of the internet protocol address, and implementations comprise, before step (b), adding one or more bits to the frame so that the first and second portions of the internet protocol address appear within a single word of the frame; and before step (e), removing the one or more bits from the frame. The frame when received from the first network further comprises a frame check sequence, and implementations comprise, after adding the one or more bits to the frame, and before transmitting the frame to the processor computing a second frame check sequence for the frame; and replacing the frame check sequence in the frame with the second frame check sequence. Implementations comprise, after removing the one or more bits from the frame, and before transmitting the frame to the second network computing a third frame check sequence for the frame; and replacing the second frame check sequence in the frame with the third frame check sequence. Each of the words is n bits and the processor operates upon n-bit words. The processor modifies the internet protocol address according to network address translation.

In general, in one aspect, the invention features a method, apparatus, and computer-readable media for transferring data from a first network to a second network through a router. It comprises receiving a frame of the data from the first network, the frame comprising a plurality of words including a first word comprising a first portion of an internet protocol address and a second word comprising a second portion of the internet protocol address; adding one or more bits to the frame so that the first and second portions of the internet protocol address appear within a single word of the frame; transmitting the frame to a processor of the router, wherein the processor modifies the internet protocol address in the frame; receiving the frame from the processor; removing the one or more bits from the frame; and transmitting the frame to the second network.

Particular implementations can include one or more of the following features. The frame when received from the first network further comprises a frame check sequence, and implementations comprise, after adding the one or more bits to the frame, and before transmitting the frame to the processor computing a second frame check sequence for the frame; and replacing the frame check sequence in the frame with the second frame check sequence. Implementations comprise, after removing the one or more bits from the frame, and before transmitting the frame to the second network computing a third frame check sequence for the frame; and replacing the second frame check sequence in the frame with the third frame check sequence. Each of the words is n bits and the processor operates upon n-bit words. The processor modifies the internet protocol address according to network address translation.

Advantages that can be seen in implementations of the invention include one or more of the following. The router can serve multiple networks even though implemented using a single CPU MAC, thereby making the router less expensive. The ports of the router are not dedicated, permitting easier setup. Quality of service decisions are not made by the CPU, freeing the CPU to perform other tasks. Multiple WAN ports are supported and/or a DMZ port is easily supported too.

The details of one or more implementations are set forth in the accompanying drawings and the description below. Other features will be apparent from the description and drawings, and from the claims.

DESCRIPTION OF DRAWINGS

FIG. 6 depicts the format of a conventional frame, according to the Institute of Electrical and Electronics Engineers (IEEE) 802.3 standard, before addition of the steering header.

FIG. 7 depicts the format of the frame of FIG. 6 after addition of the steering header according to a preferred embodiment.

Figure 1:
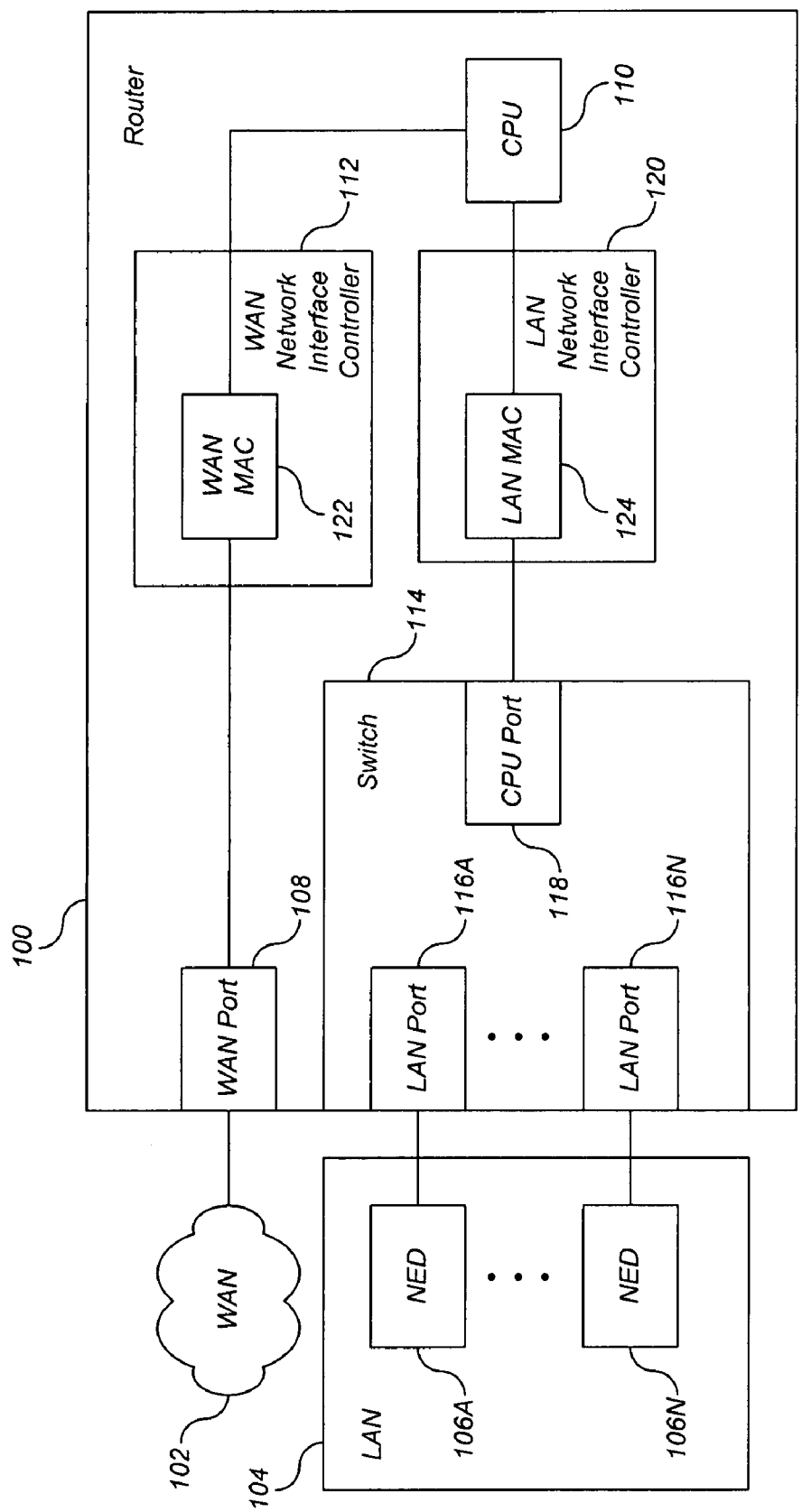
FIG. 1 shows a conventional router connected to a WAN and a LAN comprising a plurality of network-enabled devices.

The leading digit(s) of each reference numeral used in this specification indicates the number of the drawing in which the reference numeral first appears.

DETAILED DESCRIPTION

Figure 2:
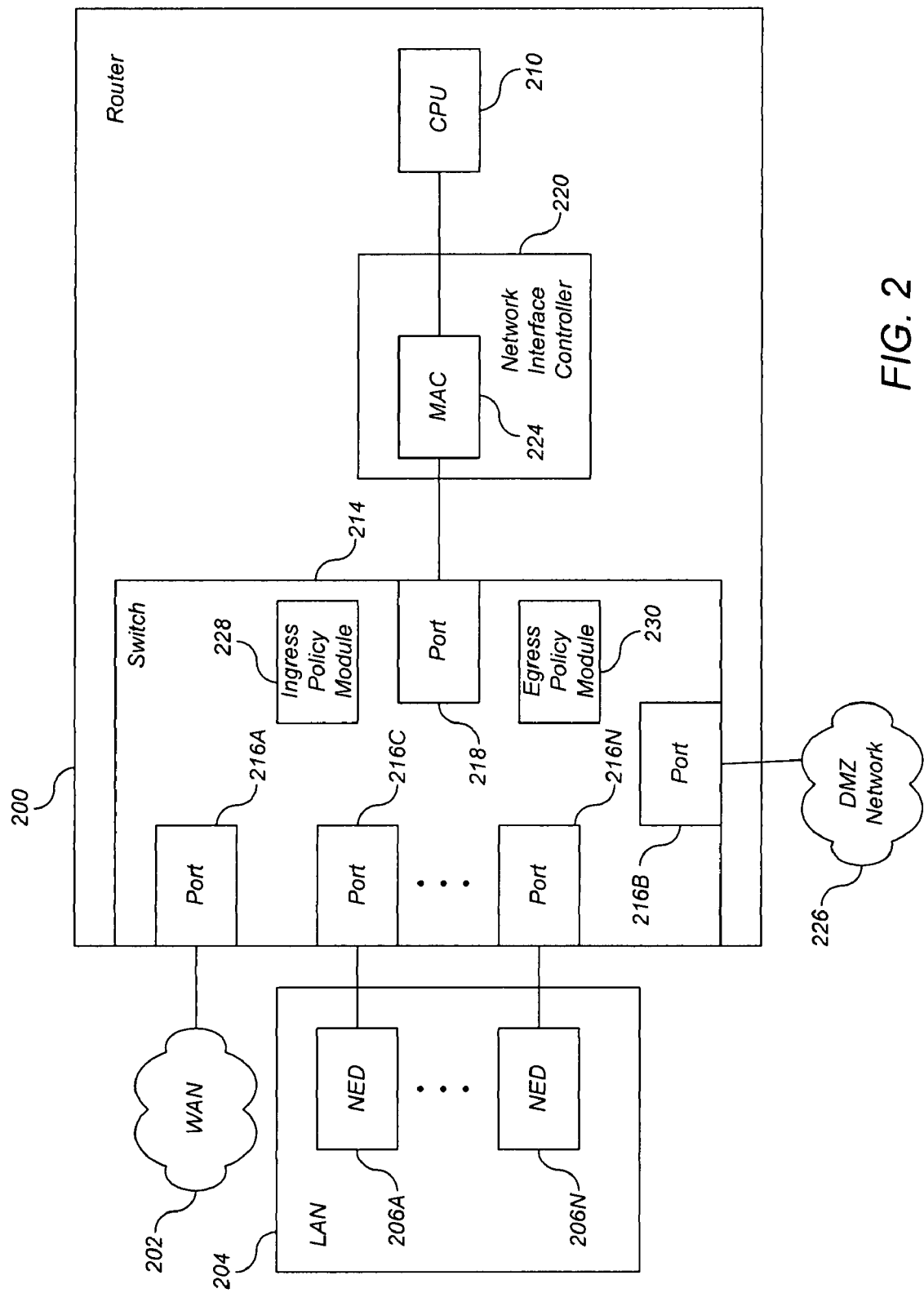
FIG. 2 shows a router according to a preferred embodiment.

FIG. 2 shows a router 200 according to a preferred embodiment. Router 200 comprises a switch 214 that comprises a plurality of ports 216A through 216N. While for convenience embodiments of the present invention are described with respect to a router, this description applies equally well to other network devices, such as gateways and the like. None of ports 216 are dedicated to a particular type of network. Referring to FIG. 2, port 216A is connected to a WAN 202, port 216B is connected to a DMZ network 226, and ports 216C through 216N are connected to network-enabled devices (NED) 226C through 226N, respectively, within a LAN 204. Switch 214 comprises a port 218 by which the switch communicates with CPU 210 via a network interface controller 220 having a single MAC 224. Switch 214 also comprises an ingress policy module 228 and an egress policy module 230.

A distinct advantage of router 200 over conventional routers such as router 100 is clear from a comparison of FIGS. 1 and 2. While the CPU 110 of conventional router 100 requires a separate MAC 122, 124 for each network connected to the router 100, the CPU 210 of a router 200 according to embodiments of the present invention requires only a single MAC 224 regardless of the number of networks connected to router 200.

Figure 3:
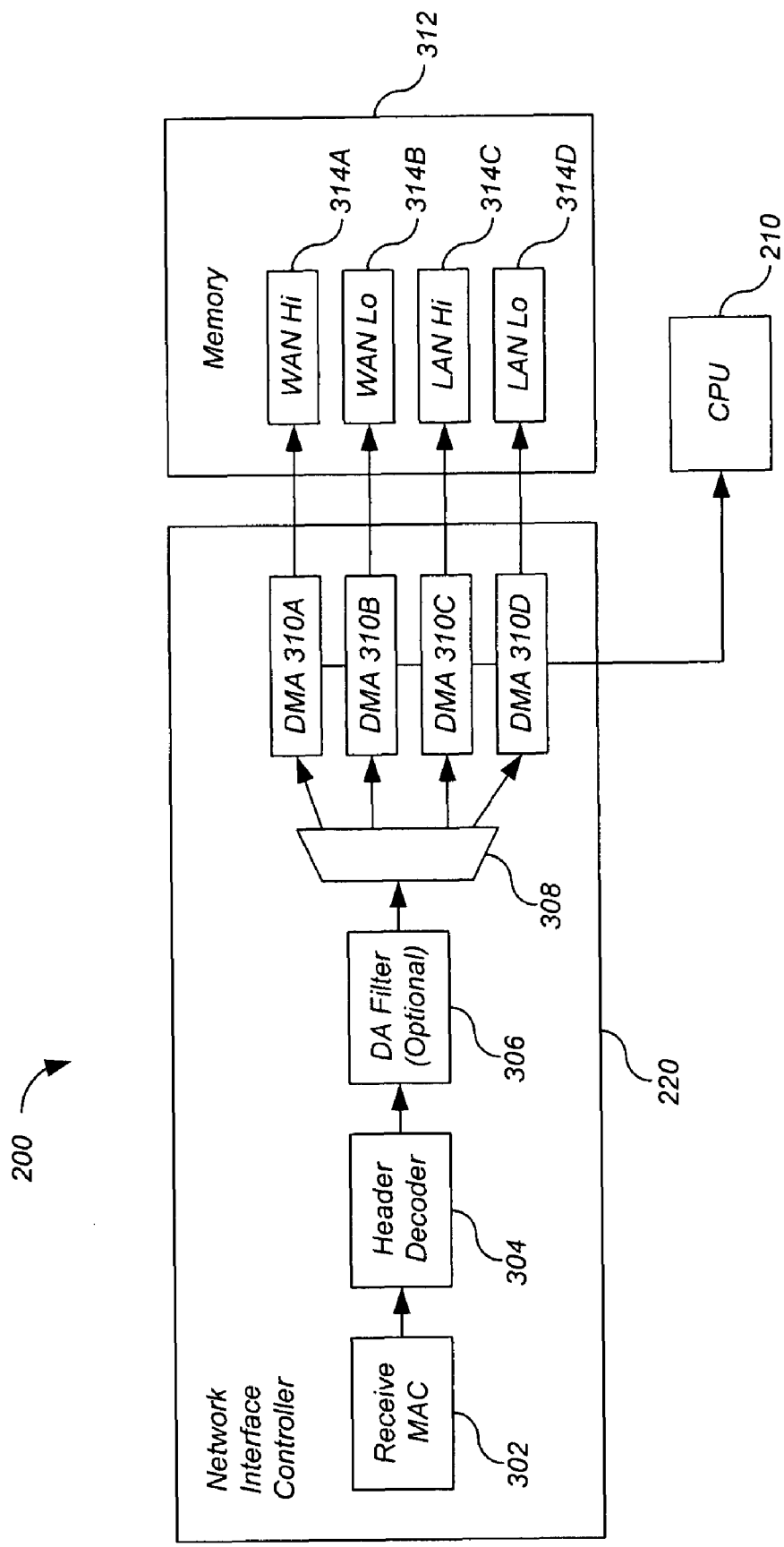
FIG. 3 shows detail of the router of FIG. 2 according to a preferred embodiment.

FIG. 3 shows detail of router 200 according to a preferred embodiment. Network interface controller 220 comprises a receive MAC 302 that receives frames of data from port 218 (FIG. 2). Network interface controller 220 also comprises a header decoder 304, an optional destination address filter 306, a demultiplexer 308, a plurality of direct memory access (DMA) engines 310, and a memory 312 comprising a plurality of receive queues 314. In one embodiment, memory 312 comprises a high-priority WAN queue 314A, a low-priority WAN queue 314B, a high-priority LAN queue 314C, and a low-priority LAN queue 314D, and network interface controller 220 comprises four corresponding DMA engines 310A, 310B, 310C, and 310D, respectively. In other embodiments, different numbers of priorities and queues are used, served by a corresponding number of DMA engines. For example, receive queues 314 can include separate queues for WAN, LAN, and DMZ, each comprising multiple priority queues. Of course, other variations are within the scope of the present invention as well.

Figure 4:
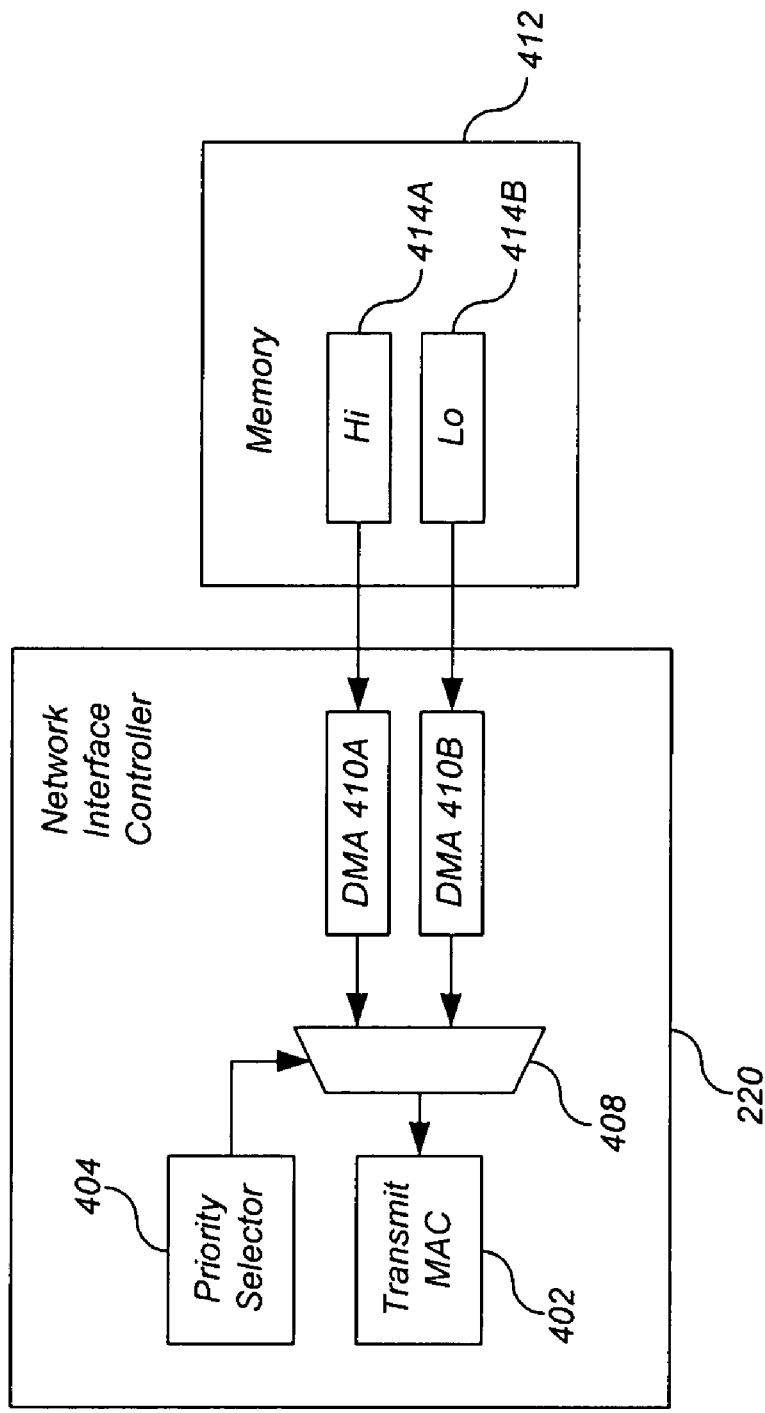
FIG. 4 shows further detail of the router of FIG. 2 according to a preferred embodiment.

FIG. 4 shows further detail of router 200 according to a preferred embodiment. Memory 312 further comprises a high-priority transmit queue 414A and a low-priority transmit queue 414B, which are served by DMA engines 410A and 410B, respectively. Each transmit queue 414 can contain frames from all of the networks served by router 200. In other embodiments, different numbers of priorities and queues are used, served by a corresponding number of DMA engines. Network interface controller 220 further comprises a multiplexer 408 that transfers frames of data from DMA engines 410 to a CPU transmit MAC 402 that is part of MAC 224 in accordance with control signals provided by a priority selector 404.

Figure 5:
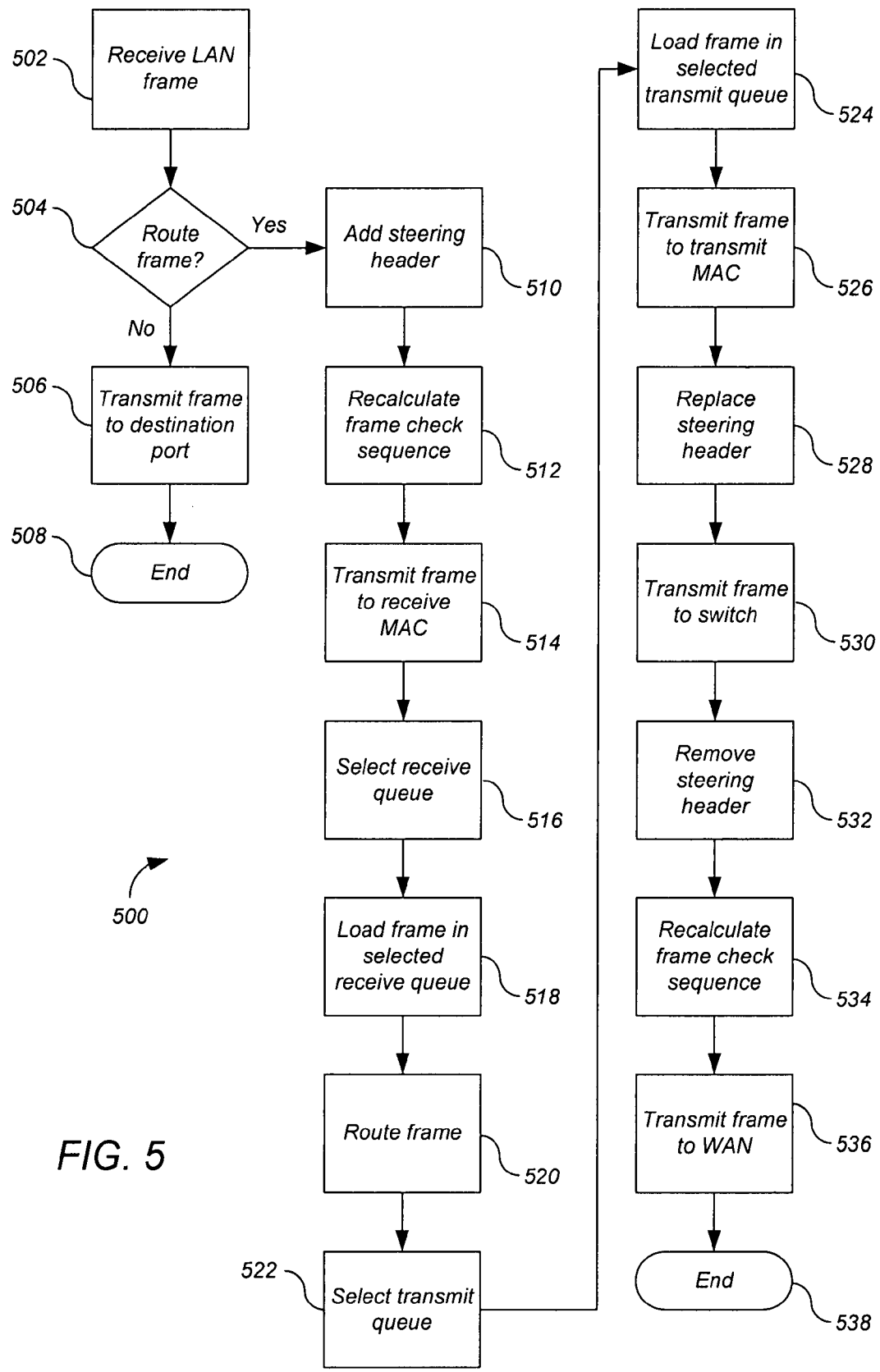
FIG. 5 shows a process performed by the router of FIG. 2 according to a preferred embodiment.

FIG. 5 shows a process 500 performed by router 200 according to a preferred embodiment. Although for clarity process 500 is described in terms of transferring a frame of data from a LAN to a WAN, it is readily generalized to transfer frames of data between any two networks served by router 200.

Router 200 receives a frame of data from LAN 202 on port 216C (step 502). Ingress policy module 228 determines whether the frame is destined for another network (step 504). If not, the frame is transmitted to its destination port (step 506) and process 500 ends (step 508). However, if in step 504 ingress policy module 228 determines that the frame is destined for another network, the frame must be routed by CPU 210.

To any frame to be transmitted to CPU 210, ingress policy module 228 adds or removes a header referred to herein as a "steering header" (step 510). FIG. 6 depicts the format of a conventional frame, according to the Institute of Electrical and Electronics Engineers (IEEE) 802.3 standard, before addition of the steering header. The fields in frame 600 are transmitted in the following order: a 7-octet preamble 602, a 1-octet start-of-frame delimiter (SFD) 604, a 6-octet destination address 608, a 6-octet source address 610, a 2-octet length/type field 612, an n-octet MAC client data field 614, an m-octet pad 616, and a 4-octet frame check sequence (FCS) 618. MAC client data field 614 begins with IP header 622. The fifth 32-bit word of IP header 622 is the destination IP address 620 of frame 600.

One disadvantage of the format of frame 600 is that destination IP address 620 spans the sixth and seventh words of the frame. That is, a first portion of the IP address is within the sixth 32-bit word of frame 600, and a second portion of the IP address in within the sixth 32-bit word of the frame. Because IP addresses are 32 bits, router CPUs are generally implemented as 32-bit processors. But, when processing a frame having the format of frame 600, a 32-bit CPU must operate upon multiple words to implement network address translation, requiring multiple CPU operations to process a single IP address.

FIG. 7 depicts the format of frame 600 after addition of the steering header according to a preferred embodiment. The fields in frame 600 are transmitted in the following order: the 7-octet preamble 602, the 1-octet start-of-frame delimiter (SFD) 604, the 2-octet steering header 706, the 6-octet destination address 608, the 6-octet source address 610, the 2-octet length/type field 612, the n-octet MAC client data field 614, the m-octet pad 616, and the 4-octet frame check sequence (FCS) 618. In a preferred embodiment, the length of steering header (M) is two octets, which may correspond to M=2×8=16 bits. Alternative steering headers may include 16×N bits, where N is an odd integer. Therefore the IP address 620 of frame 700 appears completely within a single 32-bit word, requiring only a single operation of CPU 210 to perform network address translation. In other embodiments, steering header 706 is placed in other locations within frame 600, but must precede MAC client data field 614 in order to place IP address 620 completely within a single 32-bit word.

Figure 8:
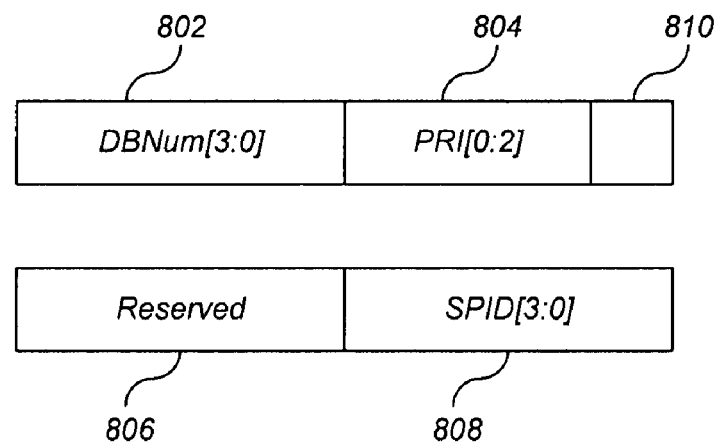
FIG. 8 depicts the format of steering header according to a preferred embodiment.

FIG. 8 depicts the format of steering header 706 according to a preferred embodiment. The first octet of steering header 706 comprises a 4-bit database number (DBNum) 802, a 3-bit priority field (PRI) 804, and a management bit 810 that indicates whether the frame is a management frame. The second octet comprises a 4-bit reserved field 806 and a 4-bit source port identifier (SPID) 808. The reserved bits can be used to extend the size of the SPID if switch 114 supports more ports. Database number 802 identifies an address database for the source port of frame 700. Priority bits 804 identify a priority of frame 700, which can be obtained from the header of the frame as received by router 200, provided by switch 214, or obtained by other methods. Source port identifier 808 identifies the source port of frame 700.

After steering header 706 is added to the frame, switch 214 recalculates the frame check sequence of the frame and places the new check sequence in FCS field 618 of the frame (step 512) Switch 214 then transmits the frame to port 218, which transmits the frame to receive MAC 302 in network interface controller 220 (step 514). Header decoder 304 selects one of receive queues 314 in memory 312 according to the contents of steering header 706 (step 516). This selection can be based on the database number, the priority bits, the source port identifier, the reserved field, or any combination thereof. Optional destination address filter 306 then selectively rejects frames according to their destination addresses (located in the new position in the frame). Demultiplexer 308 transfers the frame to the DMA engine 310 for the selected queue 314. The DMA engine 310 for the selected queue 314 loads the frame into the selected queue and generates a CPU interrupt to inform CPU 210 of the frame's availability (step 518).

CPU 210 modifies the destination IP address of the frame using the database number DBNum (or SPID to indicate WAN vs. LAN) according to network address translation (NAT—step 520). CPU 210 then selects one of transmit queues 414 according to the priority bits in steering header 706 (step 522), and places the frame in the selected transmit queue (step 524).

Figure 9:
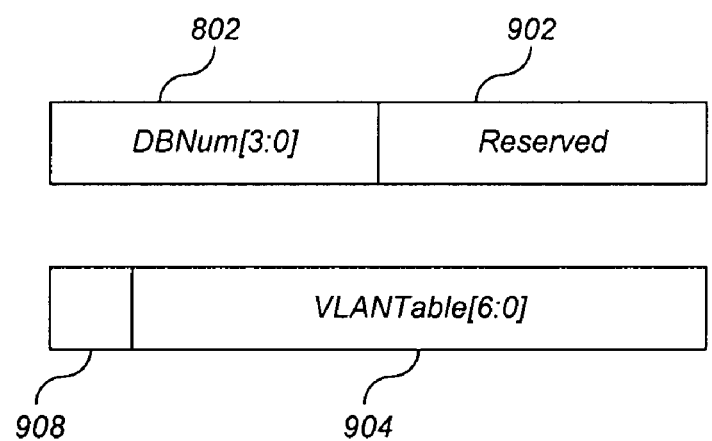
FIG. 9 depicts the format of the frame of FIG. 6 after replacement of the steering header according to a preferred embodiment.

Within network interface controller 220, multiplexer transmits frames from transmit queues 414 using DMA engines 410 to transmit MAC 402 in accordance with a priority scheme executed by priority selector 404 (step 526). CPU 210 replaces steering header 706 with steering header 906 shown in FIG. 9 (step 528). Steering header 906 comprises the 4-bit database number DBNum 802, reserved bits 902 and 908, and a 7-bit virtual LAN (VLAN) table vector (VLANTable) 904. VLANTable is a bit vector, where each bit represents a port belonging to the VLAN. VLANTable is used as a mask for flooding and switching operations performed on the frame by switch 214 to limit those operations to the VLAN defined by VLANTable. In other implementations the VLANTable bits and/or the DBNum bits can be used as an index to a table inside the switch 114 to determine the flooding mask. This indirect approach is useful when the number of ports on the switch exceeds the number of bits available in header.

Transmit MAC 402 then transmits the frame to switch 214 (step 530). Egress policy module 230 determines the destination port(s) of the frame according to DBNum and VLANTable. Egress policy module 230 adds or removes steering header 806 so the frame again has the format of frame 600 (step 532). Egress policy module 230 then recalculates the frame check sequence of the frame and places the new check sequence in FCS field 618 of the frame (step 534). Switch 214 then transmits the frame to the destination port (port 216A), which transmits the frame to WAN 202 (step 536). Process 500 then ends (step 538).

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. The fields and their bit positions can differ from those described above depending upon the implementation. This is the case, for example, when the port count in the switch exceeds 12. The number of receive DMA queues in the CPU's memory can be greater or less than described herein. One implementation solves the perceived bottleneck of merging all the data into the CPU into one common path by doubling or tripling the speed of this path. Other designs have more than one of these 'header' paths into the CPU for even more performance. Not all implementations employ quality of service (QoS) but still use the MAC described above to isolate WAN, LAN and DMZ. Accordingly, other implementations are within the scope of the following claims.

What is claimed is:

1. A network device comprising:
   one or more first ports to receive at least one layer 2 frame of data comprising a media access control (MAC) client data field, wherein the frame of data when received by one of the first ports further comprises a first frame check sequence;
   an ingress policy module to add M bits to the frame of data before the MAC client data field, where M is an integer greater than zero;
   a second port to transmit the frame of data after the M bits are added to the frame of data,
   wherein the ingress policy module, after adding the M bits to the frame of data, and before the second port transmits the frame of data, computes a second frame check sequence for the frame of data and replaces the first frame check sequence in the frame of data with the second frame check sequence; and
   an egress policy module to remove the M bits from each of the frames of data received by the second port,
   wherein the egress policy module, after removing the M bits from the frame of data, and before transmitting the frame of data, computes a third frame check sequence for the frame of data and replaces the second frame check sequence in the frame of data with the third frame check sequence.

2. The network device of claim 1, wherein M=16N, and wherein N is an odd integer.

3. The network device of claim 1, wherein the M bits added to the frame of data represent at least one of the group consisting of:
   a database number that identifies one of a plurality of address databases;
   a priority of the frame of data;
   a management bit that indicates whether the frame of data is a management frame; and
   a source port identifier that identifies the one of the first ports that received the frame of data.

4. The network device of claim 1, wherein the M bits removed from the frame of data represent at least one of the group consisting of:
   a database number that identifies one of a plurality of address databases; and
   a flooding mask for the frame of data.

5. The network device of claim 4:
   wherein the network device selects one or more of the first ports according to at least one of the database number and the flooding mask; and
   wherein the selected one or more of the first ports transmit the frame of data from the network device.

6. A network switch comprising the network device of claim 1.

7. A network device comprising:
   one or more first port means for receiving at least one layer 2 frame of data comprising a media access control (MAC) client data field, wherein the frame of data when received by one of the first port means further comprises a first frame check sequence;
   ingress policy means for adding M bits to the frame of data before the MAC client data field, where M is an integer greater than zero;
   second port means for transmitting the frame of data after the M bits are added to the frame of data,
   wherein the ingress policy means, after adding the M bits to the frame of data, and before the second port means transmits the frame of data, computes a second frame check sequence for the frame of data and replaces the first frame check sequence in the frame of data with the second frame check sequence; and
   egress policy means for removing the M bits from each of the frames of data received by the second port means,
   wherein the egress policy means, after removing the M bits from the frame of data, and before transmitting the frame of data, computes a third frame check sequence for the frame of data and replaces the second frame check sequence in the frame of data with the third frame check sequence.

8. The network device of claim 7, wherein M=16N, and wherein N is an odd integer.

9. The network device of claim 7, wherein the M bits represent at least one of the group consisting of:
   a database number that identifies one of a plurality of address databases;
   a priority of the frame of data;
   a management bit that indicates whether the frame of data is a management frame; and a source port identifier that identifies the one of the first port means that received the frame of data.

10. The network device of claim 7, wherein the M bits removed from the frame of data represent at least one of the group consisting of:
   a database number that identifies one of a plurality of address databases; and
   a flooding mask for the frame of data.

11. The network device of claim 10:
   wherein the network device selects one or more of the first ports according to at least one of the database number and the flooding mask; and
   wherein the selected one or more of the first port means transmit the frame of data from the network device.

12. A network switch comprising the network device of claim 7.

13. A method comprising:
   receiving at one or more ports at least one layer 2 frame of data comprising a media access control (MAC) client data field, wherein the frame of data further comprises a first frame check sequence;
   adding M bits to the frame of data before the MAC client data field, where M is an integer greater than zero;
   computing a second frame check sequence for the frame of data after adding the M bits to the frame of data and before transmitting the frame of data from a second port;
   replacing the first frame check sequence in the frame of data with the second frame check sequence after adding the M bits to the frame of data and before transmitting the frame of data from the second port;
   removing the M bits from the frame of data received by the second port;
   computing a third frame check sequence for the frame of data;
   replacing the second frame check sequence in the frame of data with the third frame check sequence; and
   transmitting the frame of data.

14. The network device of claim 13, wherein M=16N, and wherein N is an odd integer.

15. The method of claim 13, wherein the M bits represent at least one of the group consisting of:
   a database number that identifies one of a plurality of address databases;
   a priority of the frame of data;
   a management bit that indicates whether the frame of data is a management frame; and
   a source port identifier.

16. The method of claim 13, wherein the M bits removed from the frame of data represent at least one of the group consisting of:
   a database number that identifies one of plurality of address databases; and
   a flooding mask for the frame of data.

17. The method of claim 16, further comprising:
   transmitting the frame of data according to at least one of the database number and the flooding mask.

18. A computer readable storage device encoded with a computer program embodying instructions executable by a computer, the computer readable storage device comprising:
   receiving at one or more ports at least one layer 2 frame of data comprising a media access control (MAC) client data field, wherein the frame of data further comprises a first frame check sequence;
   adding M bits to the frame of data before the MAC client data field, where M is an integer greater than zero;
   computing a second frame check sequence for the frame of data after adding the M bits to the frame of data and before sending the frame of data from a second port;
   replacing the first frame check sequence in the frame of data with the second frame check sequence after adding the M bits to the frame of data and before sending the frame of data from the second port;
   removing the M bits from the frame of data received by the second port;
   computing a third frame check sequence for the frame of data;
   replacing the second frame check sequence in the frame of data with the third frame check sequence; and
   sending the frame of data.

19. The computer readable storage device of claim 18, wherein M=16N, and wherein N is an odd integer.

20. The computer readable storage device of claim 18, wherein the M bits represent at least one of the group consisting of:
   a database number that identifies one of a plurality of address databases;
   a priority of the frame of data;
   a management bit that indicates whether the frame of data is a management frame; and
   a source port identifier.

21. The computer readable storage device of claim 18, wherein the M bits removed from the frame of data represent at least one of the group consisting of:
   a data base number that identifies one for a plurality of address databases; and
   a flooding mask for the frame of data.

22. The computer readable medium storage device of claim 21, further comprising:
   transmitting the frame of data according to at least one of the database number and the flooding mask.

* * * * *